US010121567B2

(12) United States Patent
Shi et al.

(10) Patent No.: US 10,121,567 B2
(45) Date of Patent: Nov. 6, 2018

(54) INSULATING COMPOSITION, INSULATING ARTICLE, PREPARATION METHOD AND ELECTRICAL CABLE ACCESSORY THEREOF (71) Applicant: 3M INNOVATIVE PROPERTIES COMPANY, St. Paul, MN (US)

(72) Inventors: Ying Shi, Shanghai (CN); Qi Su, Shanghai (CN); Ming Zhang, Shanghai (CN); Meng Zhuang, Shanghai (CN); Yaming Wang, Shanghai (CN); Jingqiang Hou, Shanghai (CN); Xiaolin Jin, Shanghai (CN); Hongsheng Xu, Shanghai (CN)

( * ) Notice: Subject to any disclaimer, the term of this patent is extended or adjusted under 35 U.S.C. 154(b) by 338 days.

(21) Appl. No.: 14/763,537

(22) PCT Filed: Feb. 4, 2013

(86) PCT No.: PCT/CN2013/071337
§ 371 (c)(1),
(2) Date: Jul. 27, 2015

(87) PCT Pub. No.: WO2014/117404
PCT Pub. Date: Aug. 7, 2014

(65) Prior Publication Data
US 2016/0012937 A1 Jan. 14, 2016

(51) Int. Cl.
*C08K 3/04* (2006.01)
*H01B 3/28* (2006.01)
*H01B 3/46* (2006.01)
*C08K 5/14* (2006.01)
*C08K 7/08* (2006.01)
*C08K 9/06* (2006.01)
*C08K 13/02* (2006.01)
*F16L 3/08* (2006.01)
*F16L 59/00* (2006.01)
*H02G 3/04* (2006.01)
*H02G 1/14* (2006.01)
*H02G 15/064* (2006.01)
*H01R 11/11* (2006.01)

(52) U.S. Cl.
CPC ........... *H01B 3/28* (2013.01); *C08K 3/04* (2013.01); *C08K 3/041* (2017.05); *C08K 5/14* (2013.01); *C08K 7/08* (2013.01); *C08K 9/06* (2013.01); *C08K 13/02* (2013.01); *F16L 3/08* (2013.01); *F16L 59/00* (2013.01); *H01B 3/46* (2013.01); *H02G 1/14* (2013.01); *H02G 3/0462* (2013.01); *H02G 15/064* (2013.01); *H01R 11/11* (2013.01)

(58) Field of Classification Search
CPC . C08K 3/041; C08K 3/04; C08K 5/14; C08K 7/08; C08K 9/06
See application file for complete search history.

(56) References Cited

U.S. PATENT DOCUMENTS

| 4,363,842 | A | 12/1982 | Nelson | |
|---|---|---|---|---|
| 6,340,794 | B1 | 1/2002 | Wandmacher | |
| 6,344,155 | B1* | 2/2002 | Kitahara | H01B 1/24 252/502 |
| 7,251,881 | B2 | 8/2007 | Nguyen | |
| 2005/0205290 | A1* | 9/2005 | Pinacci | C08K 3/40 174/121 A |
| 2005/0218380 | A1 | 10/2005 | Gramespacher | |
| 2005/0237695 | A1 | 10/2005 | Kanada | |
| 2006/0004141 | A1* | 1/2006 | Maeda | C08F 210/00 525/66 |
| 2006/0068201 | A1* | 3/2006 | Alexander | C08K 3/34 428/357 |
| 2009/0054553 | A1 | 2/2009 | Meng | |
| 2011/0140052 | A1 | 6/2011 | Somasiri | |

FOREIGN PATENT DOCUMENTS

| CN | 1526755 | | 9/2004 |
|---|---|---|---|
| CN | 1681052 | | 10/2005 |
| CN | 1690015 | | 11/2005 |
| CN | 101544834 | | 9/2009 |
| CN | 101835831 | | 9/2010 |
| EP | 0708455 | A1 | 4/1996 |
| JP | 11134944 | | 5/1999 |
| SU | 1436127 | A1 | 11/1988 |
| TW | I357920 | B | 2/2012 |
| WO | WO 2005102724 | | 11/2005 |
| WO | WO 2010045217 | | 4/2010 |

OTHER PUBLICATIONS

Textbook, "Design for Plastic Formulation", 6pgs.
International Search Report for PCT International Application No. PCT/CN2013/071337 dated Oct. 24, 2013, 4 pages.
Baidu, "Silane Coupling Agent KH 450", dated Nov. 17, 2016, 4pgs.

* cited by examiner

Primary Examiner — Hannah J Pak
(74) Attorney, Agent, or Firm — Gregg H. Rosenblatt (57) ABSTRACT

An insulating composition comprises: about 70-100 parts by volume of a polymeric material, about 5-30 parts by volume of a ceramic filler (2) which is surface-treated by a bifunctional coupling agent in an amount of about 0.1 wt % to about 4 wt % of the ceramic filler; about 0.1-5 parts by volume of a crosslinking agent; about 0-6 parts by volume of conductive powder (3); and about 0-6 parts by volume of ZnO whisker (4). A preparation method for making the insulating composition, an insulating article such as an electrical cable accessory, and a use thereof are provided.

9 Claims, 2 Drawing Sheets

INSULATING COMPOSITION, INSULATING ARTICLE, PREPARATION METHOD AND ELECTRICAL CABLE ACCESSORY THEREOF

TECHNICAL FIELD

The present invention relates to an insulating composition, a method of preparing the insulating composition, an insulating article, and an electrical cable accessory made therefrom. Specifically, the insulating composition is suitable to make an electrical cable accessory, e.g. a prefabricated or cold shrink cable termination, and the electrical cable accessory is capable of being used for splicing or terminating medium voltage (MV) electrical power cables.

BACKGROUND

Electrical power cables are widely used for distributing power across vast power grids or networks, moving electricity from power generation plants to the consumers of electric power. Power cables may be constructed to carry high voltages (greater than about 50,000 Volts), medium voltages (between about 1,000 Volts and about 50,000 Volts), or low voltages (less than about 1,000 Volts).

As power cables are routed across the power grids to the consumers of electric power, it is often necessary or desirable to periodically terminate the electrical cable for making a connection to electrical equipment. Typically, a termination is used to make electrical connection between the insulated electrical cable and an unshielded, un-insulated conductor. The termination fits over an end of the insulated cable.

A cable termination of the electrical cable creates an abrupt discontinuity in the electrical characteristics of the cable. The discontinuity changes the shape of the resulting electrical field and electrical stress so as to increase the risk of insulation breaking down. Thus, one function of a cable termination, among others, is to compensate for the change in electrical field and electrical stress generated when there is a discontinuity in the electrical cable. The cable termination also functions to protect the terminated end portion from the ambient conditions.

With respect to medium voltage (MV) terminations, it is necessary to control electrical field stresses built up at the locations of splices and terminations. Generally, there are two ways to achieve such a control. The first way is to apply a stress cone, as disclosed in U.S. Pat. No. 7,251,881B2, wherein the termination is relatively large and two steps of molding are needed. The second way is to apply a stress control tube of stress relief material. However, since the traditional stress relief material has a high dielectric constant but a poor dielectric strength, two layers are needed for a cable termination. One layer is made of a material with a high dielectric constant, which provides an electrical stress relief function, and another layer is made of an insulating material for insulation which covers on the outside of the layer of high dielectric constant. As a result, the two layers need to be produced and installed separately, leading to a complex procedure and a higher cost.

Cold shrink technology offers easy installation and reliable performance when terminating indoor and outdoor medium voltage cables. For cold shrink tubes used for cable terminations, the mechanical property, especially elongation at break, is critical for the application. Further, in order to be used as one layer tube for a termination, the material for the tube should have a high volume resistivity.

Therefore, there is a need to develop an insulating composition having a satisfactory dielectric constant suitable to make an electrical cable accessory, for example, cable terminations of at least MV electrical cable.

SUMMARY

In one aspect, the present application provides an insulating composition, which, after curing, has a high dielectric constant and a high dielectric strength, and is suitable for making an electrical cable accessory; e.g., a cold shrink tube of a medium voltage termination, to achieve functions of stress relief and insulation, with one layer of structure. It can greatly simplify the process of production and reduce cost. In addition, the dielectric loss of the composition is also much lower than a traditional stress control material, which can significantly reduce the increase in temperature during use, resulting in longer service life and higher reliability.

In another aspect, the present application provides a method of preparing the insulating composition.

In yet another aspect, the present application provides a use of the insulating composition for making an insulating article, such as a cable termination or other cable accessories.

In a further aspect, the present application provides an insulating article, such as a cable termination accessory made from the insulating composition.

The above and other features and advantages of the present invention will become apparent from the following detailed description of embodiments and the appended claims.

BRIEF DESCRIPTION OF THE DRAWINGS

The present invention is further described with reference to the accompanying figures, wherein:

FIGS. 3 (a) and (b) are section views of indoor and outdoor cable terminations in an embodiment, respectively.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be used, and structural or logical changes may be made without departing from the scope of the present invention. The following detailed description, therefore, is not to be taken in a limiting sense, and the scope of the invention is defined by the appended claims.

In one aspect, one embodiment of the present application provides an insulating composition, comprising:

about 70-100 parts by volume of a polymeric material;

about 5-30 parts by volume of a ceramic filler which has been surface-treated by a bifunctional coupling agent in an amount of about 0.1-4 wt % of the ceramic filler;

about 0.1-5 parts by volume of a crosslinking agent;

about 0-6 parts by volume of conductive carbon powder; and about 0-6 parts by volume of ZnO whisker.

The resulting elastomeric material after curing of the above composition has an elongation at break above about 500%, a dielectric constant above about 3.6, a dielectric loss (tan δ) below about 1, a dielectric strength above about 10 kV/mm, and a volume resistivity above about $10^{13}$ Ω·cm.

The polymeric material may be selected from a large range of polymers and polymer precursors. Blends of two or more polymers and polymer precursors may be desirable in some cases. Particularly, polymeric materials capable of recovering after being stretched are suitable to be used in the composition. Examples of polymers and polymer precursors suitable either alone or in blends include elastomeric materials, for example rubbers and elastomers, such as silicones (solid and liquid) and hydrocarbon rubbers, e.g. EPDM (ethylene-propylene-diene monomer), EPM (ethylene propylene monomer), and butyl rubber. As used herein, the term "silicone" refers to a polymer having a Si—O backbone.

The polymers and polymer precursors selected will depend at least to a certain extent on the purpose for which the material is to be used. For example, for an application as cable terminations, the polymeric material may be selected from those commonly used for such a purpose. In view of a good weatherability and a high insulating property, preferable examples are elastomeric materials such as silicones (solid and liquid), and hydrocarbon rubbers, e.g. EPDM or EPM.

Examples of commercially available materials that can be used as the polymeric material herein include but are not limited to those fluid silicones available as DC 10000 from Dow Corning Corporation, USA, and the like, and gum silicones available as YT6141-30 from Zhejiang Wynca Chemical Industry Group Co., China, Elastosil R300/30 from Wacker Silicones Corporation, Germany, and the like.

The composition further comprises a ceramic filler dispersed in the polymeric material. The ceramic filler used in the composition is treated by a surface modifier.

Specifically, a ceramic material having both a good insulating property and a high dielectric constant are suitable for used herein as the ceramic filler. By adding the filler into the polymeric material, the dielectric constant of the composition can be significantly increased, while a good insulating property is maintained. In some embodiments, the filler is one or more selected from titanates, oxides, borides, carbides, silicates, hydroxides, nitrides, perovskites, phosphides, sulfides, silicides and combinations thereof. Non-limiting examples of the ceramic filler include barium titanate ($BaTiO_3$), strontium titanate, barium strontium titanate, calcium copper titanate, titania, zinc oxide, zirconia, magnesia, cesium oxide, boron nitride, aluminum oxide, silicon oxide (for example silica), cerium oxide, copper oxide, calcium oxide, niobium pentoxide, tantalum pentoxide, lead zirconium oxide, lead zirconium titanium oxide and combinations thereof.

In some embodiments, the ceramic filler is one or more selected from barium titanate ($BaTiO_3$), strontium titanate, barium strontium titanate, calcium copper titanate, titania, zinc oxide and combinations thereof.

In some embodiments, the ceramic filler is at least one selected from powdered ferroelectric materials. In some embodiments, barium titanate, barium strontium titanate, or combination thereof is used as the ceramic filler.

The ceramic filler can be used in various shapes or forms. Examples include but are not limited to particulates such as substantially spherical particles, fibers, platelets, flakes, whiskers, or rods. The ceramic filler can vary in size, and there is no special limit. In some specific embodiments, the ceramic filler may have a particle size of nanometer, submicron or micron scale, such as a particle size, e.g. diameter, in a range of about 50 nm to about 200 μm, about 100 nm to about 100 μm, about 200 nm to about 50 μm, or about 500 nm to about 10 μm. In some embodiments, the ceramic filler is in a form of substantially spherical particles and may have a diameter in a range of about 100 nm to about 100 μm.

Generally, the dielectric constant (ε) of the composition increases along with the amount of the ceramic filler. However, a large amount of fillers added into the polymeric material will greatly decrease the elongation at break. In some embodiments, based on about 70-100 parts by volume of the polymeric material, the ceramic filler is used in an amount of about 5-30 parts by volume. In some embodiments, based on about 70-100 parts by volume of the polymeric material, the amount of the ceramic filler is about 5 parts by volume or higher, about 8 parts by volume or higher, about 10 parts by volume or higher, or about 12 parts by volume or higher, and about 30 parts by volume or lower, about 27 parts by volume or lower, about 24 parts by volume or lower, or about 21 parts by volume or lower. In some embodiments, based on about 70-100 parts by volume of the polymeric material, the ceramic filler is used in an amount of about 8-27 parts by volume, about 10-24 parts by volume, or about 12-21 parts by volume.

A bifunctional coupling agent is used as the surface modifier for the ceramic filler. As used herein, the term "bifunctional coupling agent" refers to a coupling agent having two hydrolysable functional groups for a coupling reaction.

A surface treatment of the ceramic filler by the bifunctional coupling agent is advantageous for increasing the compatibility at the interface between the ceramic filler and the polymeric material, improving the mechanical property, and specifically, enhancing the elongation at break, of the composite material.

The bifunctional coupling agent can be at least one selected from silane coupling agents, which has two hydrolysable functional groups, such as silyl groups.

In some embodiments, KH450, a bifunctional silane coupling agent obtained from Nanjing Nengde Chemical Co., China is used. KH450 is a coupling agent with two silyl groups, and therefore enhances the interfacial property and increases the elongation at break of the resulting material. Other examples of commercially available bifunctional coupling agent include but are not limited to those under trade names of WETLINK 78, A-2120, A-2639 from Momentive USA; and Z-6042 from Dow Corning Corporation, USA.

Based on the amount of the ceramic filler, the bifunctional coupling agent is used in an amount of about 0.1-4 wt %. In some embodiments, the coupling agent is used in an amount of about 0.1 wt % or higher, about 0.2 wt % or higher, about 0.4 wt % or higher, or about 0.6 wt % or high, and about 4 wt % or lower, about 2 wt % or lower, about 1.8 wt % or lower, about 1.6 wt % or lower, or about 1.4 wt % or lower, based on the amount of the ceramic filler. In some embodiments, the coupling agent is used in an amount of about 0.1-4 wt %, about 0.2-2 wt %, about 0.4-1.8 wt %, or about 0.6-1.6 wt %, based on the amount of the ceramic filler. If the amount of the coupling agent is too high, the tensile strength of the resulted material decreases. If the amount of the coupling agent is too low, the elongation at break of the resulted material decreases sharply.

In order to fulfill the requirement of cold shrink tubes of cable terminations, the elongation at break of the material is preferably about 500% or higher. In some embodiments, based on the amount of the ceramic filler, by using about 0.5-1 wt % of KH450 as the coupling agent, the elongation at break of the material can be increased to about 530-590%.

The crosslinking agent is used as an aid for solidifying the polymeric material. The crosslinking agent can be any one known to be used for such a purpose, such as one or more selected from organic peroxide vulcanizing agent, and metal-based crosslinking agents. Examples include but are not limited to organic peroxide vulcanizing agent, such as benzoyl peroxide, 2,4-dichlorobenzoyl peroxide, monochlorobenzoyl peroxide, 2,5-dimethyl-2,5-di(tert-butylperoxy), t-butylperoxy benzoate, dicumylperoxide, cumyl-t-butyl peroxide, etc.; platinum-based crosslinking agents such as chloroplatinic acid, alcohol solutions of chloroplatinic acid, complexes of chloroplatinic acid with olefins, complexes of chloroplatinic acid with divinylsiloxane, and platinum black.

In some embodiments, based on about 70-100 parts by volume of the polymeric material, about 0.1-5 parts by volume of a crosslinking agent is used. In some embodiments, based on about 70-100 parts by volume of the polymeric material, the amount of the crosslinking agent is about 0.1 parts by volume or higher, about 0.2 parts by volume or higher, or about 0.4 parts by volume or higher, and about 5 parts by volume or lower, about 3 parts by volume or lower, about 2 parts by volume or lower, about 1.6 parts by volume or lower, about 1.2 parts by volume or lower, or about 1.0 parts by volume or lower. In some embodiments, based on about 70-100 parts by volume of the polymeric material, the crosslinking agent is used in an amount of about 0.1-3 parts by volume, about 0.2-1.6 parts by volume, or about 0.4-1.2 parts by volume. If the amount of the crosslinking agent is too high, the elongation at break of the resulted material decreases. If the amount of the crosslinking agent is too low, the insufficient crosslinking density leads to poor mechanical properties.

In some embodiments, 2,5-dimethyl-2,5-di(tert-butylperoxy) is used as the crosslinking agent.

In some embodiments, the composition further comprises conductive carbon powder. Conductive carbon powder acts as a conductor, and is an optional component. The amount of the conductive carbon powder may be about 6 parts by volume or lower, based on about 70-100 parts by volume of a polymeric material. In some embodiments, based on about 70-100 parts by volume of the polymeric material, the amount of the conductive carbon powder is about 0.1 parts by volume or higher, about 0.2 parts by volume or higher, about 0.4 parts by volume or higher, or about 0.8 parts by volume or higher, and about 6 parts by volume or lower, about 5 parts by volume or lower, about 4 parts by volume or lower, or about 3 parts by volume or lower. In some embodiments, based on about 70-100 parts by volume of the polymeric material, the conductive carbon powder is used in an amount of about 0.1-6 parts by volume, about 0.2-5 parts by volume, or about 0.4-4 parts by volume. If the content of the conductive carbon powder is too high, the dielectric strength of the material will be deteriorated. A small amount of the conductive carbon powder as described above, on the other hand, does not influence the dielectric property, but contributes to the application of the electric field on the ceramic filler, further increasing the dielectric constant.

Examples of the conductive carbon powder include but are not limited to carbon black, carbon nanotube, and graphite.

Any conductive carbon black can be used. Examples of commercially available carbon black include but are not limited to those under trade names of BP2000, VXC72, VXC605, and R660 from Cabot Co., USA; ENSACO® 150 G, ENSACO®260 G, and ENSACO® 250 G from TIMCAL Graphites & Carbon Corp., Belgium.

If used, the conductive carbon powder is typically affixed on the surface of the ceramic filler, which has been treated by the coupling agent, before combining with other components. The affixation of the conductive carbon powder to the ceramic filler can be carried out in any suitable manner, such as by mixing, ball milling, grinding, impact coating, or magnetically assisted impact coating the two components, i.e. the conductive carbon powder and the surface treated ceramic filler, together. The affixation of the conductive carbon powder to the ceramic filler can also be carried out by solvent coating, vapor-depositing, or liquid immersion the conductive carbon powder onto the surface of the ceramic filler.

Figure 1:
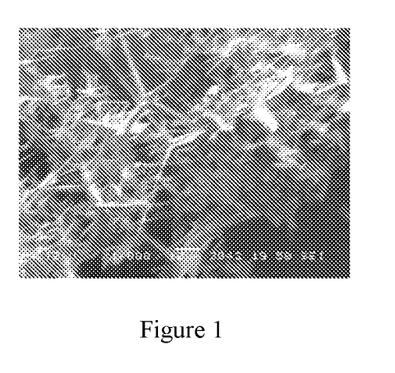
FIG. 1 is a SEM image showing morphology of ZnO whisker.

In some embodiments, the composition further comprises ZnO whiskers. Unlike conventional ZnO particles, the ZnO whiskers have a morphology comprising four pronged cross, as shown in FIG. 1. Due to the prong-tip structure on nano-scale, the ZnO whisker is semi-conductive. Further, the long prongs on micron-scale lead to a high specific surface area. By the addition of the ZnO whiskers into the composition, the ceramic filler particles are connected by the whiskers and a network structure is constructed. Therefore, the dielectric property of the material is further improved.

In some embodiments, based on about 70-100 parts by volume of the polymeric material, the amount of the ZnO whiskers is about 0-6 parts by volume. In some embodiments, based on about 70-100 parts by volume of the polymeric material, the amount of the ZnO whiskers is about 0.2 parts by volume or higher, about 0.5 parts by volume or higher, or about 1 parts by volume or higher, and about 6 parts by volume or lower, about 5 parts by volume or lower, or about 4 parts by volume or lower. In some embodiments, based on about 70-100 parts by volume of the polymeric material, the ZnO whiskers is used in an amount of about 0.2-6 parts by volume, about 0.5-5 parts by volume, or about 1-4 parts by volume. If the amount of the ZnO whiskers is too high, the insulation property of the composite material will be deteriorated.

Commercially available ZnO whiskers may be used, for example, that under the name of ZnO whisker from Chengdu Crystrealm Co., China.

Figure 2:
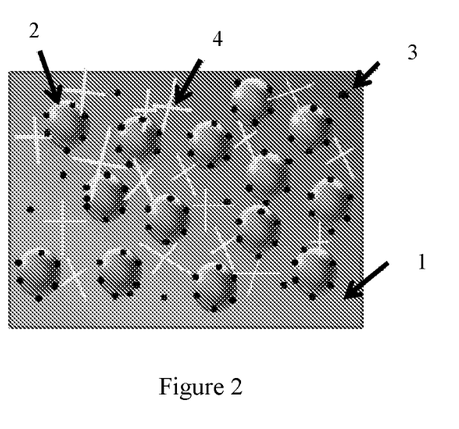
FIG. 2 is a schematic diagram showing distribution of fillers in the composition.

In some embodiments, the composition comprises both the conductive carbon powder and the ZnO whiskers. FIG. 2 is a schematic diagram showing distributions of the components in the composition, with 1 representing the polymeric material, 2 representing the ceramic filler, 3 representing the conductive carbon powder, and 4 representing the ZnO whisker.

As shown in the figure, the ceramic filler particles are dispersed in the polymeric material. A majority of the conductive carbon powder are affixed on the ceramic filler, with some powder particles distributed in the polymeric material. The ZnO whiskers function as a link among the ceramic filler particles, forming a three dimensional network in the polymeric material base. As a result of this special structure, the material has good dielectric properties.

The composition may also comprise other additives well known in the art, for example to improve its processability and/or suitability for particular applications. For example, materials for use as power cable accessories may need to withstand outdoor environmental conditions. Suitable additives may thus include processing agents, stabilizers, antioxidants and plasticizers.

In another aspect, the present application provides a method of preparing an insulating composition.

In some embodiments, the method of preparing the insulating composition comprises steps of:

(a) subjecting a ceramic filler to a surface treatment by a bifunctional coupling agent in an amount of about 0.1-4 wt % of the ceramic filler; and (b) mixing about 70-100 parts by volume of a polymeric material, about 5-30 parts by volume of the treated ceramic filler, about 0.1-5 parts by volume of a crosslinking agent, about 0-6 parts by volume of conductive carbon powder, and about 0-6 parts by volume of ZnO whisker.

The surface treatment of the ceramic filler by the bifunctional coupling agent in step (a) is performed by mixing the ceramic filler with a solution of the coupling agent or spraying a solution of the coupling agent on the ceramic filler. The solvent for preparing the solution of the coupling agent can be one or more selected from water, alcohols, ketones, ethers, esters, and amides. Examples of the solvent include but are not limited to water, methanol, ethanol, propanol, acetone, diethyl ether, ethyl acetate, and dimethyl formamide (DMF). A mixture of two or more selected from the above mentioned solvents may be used. In some embodiments, a mixture of water in ethanol is used as the solvent for dissolving the bifunctional coupling agent. In some embodiments, the mixture of water in ethanol is in a concentration of about 1-50 wt %, about 2-30 wt %, or about 5-20 wt % water in ethanol. In some embodiments, a mixture of about 10 wt % water in ethanol is used as the solvent for dissolving the bifunctional coupling agent. The concentration of the coupling agent solution is not specifically limited, as long as the coupling agent can be evenly distributed onto the surface of the ceramic filler. In some embodiments, the concentration of the coupling agent solution is in a range of about 1-80 wt %, particularly in a range of about 2-60 wt %, more particularly in a range of about 4-40 wt %, and most particularly in a range of about 5-20 wt %.

When the surface treatment is performed by mixing, the ceramic filler and the solution of the coupling agent are mixed for a period of time that is sufficient for the surface treatment, for example, at least about 0.5 minute, at least about 1 minute, at least about 2 minutes, or at least about 5 minutes, and less than about 120 minutes, or less than about 60 minutes. In some embodiments, the mixing is performed for about 10 minutes.

After mixing or spraying, the ceramic filler is dried to remove the solvent. The drying may be performed in an oven at a temperature between about 60° C. and about 120° C. for about 2 to about 6 hours. In some embodiments, the drying is performed at about 80° C. for about 3 hours.

The mixing of step (b) may be performed by any means in the art. For example, the components may be mixed in an open mill or a Banbury mixer.

In some embodiments, the conductive carbon powder is affixed to the surface treated ceramic filler obtained in step (a) before mixing with other ingredients in step (b). The affixation of the conductive carbon powder to the ceramic filler can be carried out in any suitable manner, such as by mixing, ball milling, grinding with mortar and pestle, impact coating, or magnetically assisted impact coating the two components, i.e. the conductive carbon powder and the surface treated ceramic filler, together. The affixation of the conductive carbon powder to the ceramic filler can also be carried out by solvent coating, vapor-depositing, or liquid immersing the conductive carbon powder onto the surface of the ceramic filler. Based on about 70-100 parts by volume of the polymeric material, the conductive carbon powder is used in an amount of about 6 parts by volume or less, such as about 0.1-6 parts by volume, about 0.2-5 parts by volume, or about 0.4-4 parts by volume.

In yet another aspect, an embodiment of the present application provides a use of the insulating composition for making an insulating article, for example, a cable termination accessory such as a cold shrink tube for a MV cable termination.

In another aspect, an embodiment of the present application provides an insulating article comprising the insulating composition as described above which is at least partly cured. In some embodiments, the article is obtained by forming the insulating composition into a desirable shape and then at least partly curing the insulating composition. The procedures for shaping and curing can be carried out by any method commonly known in the art. For example, the insulating composition may be formed into a desirable shape by injection moulding, extrusion, extrusion-blow moulding, transfer moulding, or injection-expansion moulding. Specifically, the insulating composition may be formed into a desirable shape of a one layer structure by one-time injection or extrusion, such as injection moulding, extrusion, extrusion-blow moulding, transfer moulding, or injection-expansion moulding. The shaped composition may be cured at a temperature in a range of about 120 to about 220° C., about 140 to about 200° C., or about 160 to about 180° C., for at least about 5 minutes, or at least about 10 minutes. In some embodiments, the insulating composition is formed into a desirable shape by injection moulding, and then cured at 170° C. for 10 minutes.

In some embodiments, the insulating article is used to shield a conductor. Specifically, the insulating article is used to control electrical stress generated when there is a discontinuity in the electrical cable. For example, the insulating article is an electrical cable accessory, such as a cold shrink tube or a prefabricated type tube for a cable termination, which is of one layer structure. In some other embodiments, the insulating article may have other geometric configurations for preventing unacceptably high local electric field concentrations, for example in break elbows, transition connections, feed throughs and branchings of high tension cables.

The insulating article, such as an electrical cable accessory may be prepared by extrusion or injection moulding of the composition as described above in one step, and then crosslinked (cured) to obtain the final product. Compared to the conventional stress cone or stress control tube which requires two steps of molding, the preparation process of the electrical cable accessory of the present invention is simpler and more cost efficient. The one layer structure is also advantageous for reducing the influence of interface deficiency on the electric property of the product.

The thickness of the layer of the insulating material formed from the composition as described above in the electrical cable accessory may vary according to the dielectric constant of the material and the cross-sectional area of the cable. In some embodiments, when the dielectric constant of the material is above 3.6, the insulating material in a thickness of above about 10 mm can meet the requirements on partial discharge and BIL (Basic Insulation Level) for cables having a cross-sectional area of about 35 to about 120 mm$^2$. With an increase of the dielectric constant of the material, the thickness may be reduced accordingly.

Figure 3:
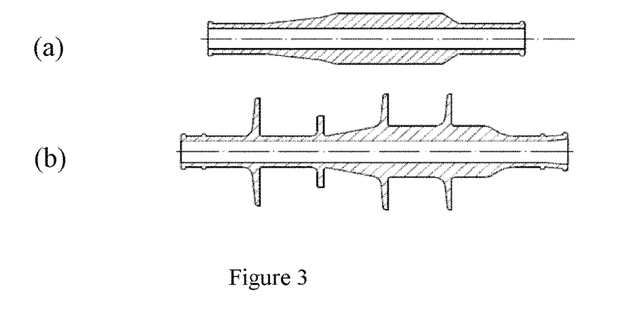

FIG. 3 shows two examples of electrical cable accessories for terminations, wherein (a) is a section view of a cold shrink tube for an indoor termination, and (b) is a section view of a cold shrink tube for an outdoor termination. In some embodiments, the thickness of the tube in the middle of the termination where the electric stress is more concentrated is higher than the thickness of the material at both ends in order to achieve a better electric performance. For outdoor termination, the tube may further comprise a plurality of skirts, which may extend approximately perpendicular to the longitudinal axis of the tube or may be angled toward the body of the tube, and may be uniformly distributed at least partially along the longitudinal axis of the tube. By uniformly distributing the skirts, the risk of flashover is lowered.

In a further aspect, the present application provides a cable termination comprising one layer of insulating material surrounding an inner conductor, wherein the insulating material is made from the insulating composition as described above.

The following examples and comparative examples are provided to aid in the understanding of the present invention and are not to be construed as limiting the scope thereof. Unless otherwise indicated, all parts and percentages are by volume. The following test methods and protocols were employed in the evaluation of the illustrative and comparative examples that follow.

Materials used in the Examples and Comparative Examples are summarized below in Table 1.

TABLE 1

| Trade Name | Chemical Name | Basic Function | Manufacturer |
| --- | --- | --- | --- |
| YT6141-30 | Silicone rubber | Polymer Precursor | Zhejiang Wynca Chemical Industry Group Co., China |
| DBT-301 | Barium titanate (BT) (Particle size: D50 2.2 μm) | Ceramic Filler | Shanghai Dian Yang Industrial Co., China |
|  | Barium strontium titanate (BST) (Particle size: D50 2.3 μm) | Ceramic Filler | Shanghai Dian Yang Industrial Co., China |
| M120 | Carbon black | Conductive Filler | Cabot Co., USA |
|  | Zinc oxide whisker | Filler | Chengdu Crystrealm Co., China |
| KH450 | Silane coupling agent | Surface treating agent | Nanjing Nengde chemical Co., China |
| KH550 | Silane coupling agent | Surface treating agent | Nanjing Nengde chemical Co., China |
| KH560 | Silane coupling agent | Surface treating agent | Nanjing Nengde chemical Co., China |
| KH171 | Silane coupling agent | Surface treating agent | Nanjing Nengde chemical Co., China |
| C8A | 2,5-Dimethyl-2,5-di(tert-butylperoxy) | Crosslinking agent | Shenzhen Da Wei Technology Co., China |

Characterization Methods

Dielectric constant (ε) is measured according to ASTM D150-98.

Breakdown strength is measured according to ASTM D149-09.

AC (Alternating Current) withstanding is measured according to GB/T 12706.4-2008.

Partial discharge is measured according to GB/T 12706.4-2008.

Initiative partial discharge is measured according to GB/T 12706.4-2008.

BIL (Basic Insulation Level) is measured according to GB/T 12706.4-2008.

Elongation at break is measured according to ASTM D412-06a.

Dielectric loss is measured according to ASTM D150-98.

Shore A hardness is measured according to ASTM D2240-05.

Volume resistivity is measured according to ASTM D257-07.

EXAMPLES

Examples and Comparative Examples below show the functions of different fillers and surface treating agents on the electrical or mechanical properties of the material, respectively.

Example 1

This example shows the effect of silane coupling agent on elongation at break.

A specific silane coupling agent KH450, having two hydrolyzable groups, was used for the surface treatment of BT.

KH450 in an amount of 1 wt % of BT was dissolved in a solution of 10 wt % water in ethanol (deionized water/ethanol=1:9 by weight) at a weight ratio of 1:10 to obtain a 9 wt % KH450 solution. The solution was evenly sprayed onto the surface of BT. Then, the sprayed BT was dried in an oven at 80° C. for 3 hours to remove the solvent and moisture. 20 parts by volume of the treated BT was mixed with 80 parts by volume of silicone rubber and 0.56 part by volume of a crosslinking agent, 2,5-dimethyl-2,5-di(tert-butylperoxy), by two roll mill machine (Type X(S)K-160, manufactured by Shanghai Rubber Machinery Factory, China). The mixture was then molded into a plate with dimensions of 20 mm×20 mm×2 mm, and crosslinked at 170° C. and pressure 2000 psi for 10 min by a press vulcanizer (manufactured by Dongguan Hsin-chi Jingmi Machinery Co. Ltd., China).

Comparative Examples 2-5

The procedure of Example 1 was repeated, except that no silane coupling agent was used (Comparative Example 2), or a silane coupling agent, KH550, KH560, or KH171, multi-functional silane coupling agent having at least three hydrolyzable groups for a coupling reaction, were used to replace KH450 (Comparative Examples 3-5, respectively).

Figure 4:
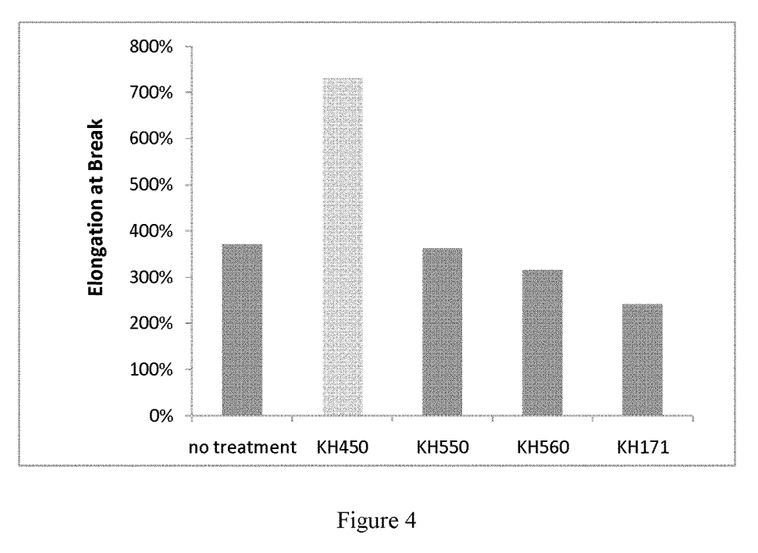
FIG. 4 is a graph showing effects of treatments with different silane coupling agents on elongation at break.

It can be clearly seen from FIG. 4 that in Example 1, KH450 remarkably increased the elongation at break of the molded article, a critical factor for application in cold shrink type terminations, to above 700%. On the other hand, in Comparative Examples 2-5, the elongation at break of the molded article is below 400%. Without being bound to any theory, it is expected that this is due to an enhancement of the interaction between the fillers and the silicone rubber after a surface treatment of the filler by KH450.

Examples 6-8

The procedure of Example 1 was repeated, except that components in amounts as shown in Table 2 were used. In Example 8, BST was used to replace BT and subjected to the same surface treatment procedure. The samples were evaluated by tests as described above. Test results of dielectric constant and breakdown strength are shown in Table 2. The result of Example 1 is also listed in Table 2 for comparison.

TABLE 2

| Example No. | Barium Titanate (Parts by Volume) | Barium Strontium Titanate (Parts by Volume) | Silicone Rubber (Parts by Volume) | Crosslinking Agent (Parts by Volume) | Dielectric Constant | Breakdown Strength (kV) |
|---|---|---|---|---|---|---|
| 6 | 10 | — | 90 | 0.63 | 3.8 | 21 |
| 1 | 20 | — | 80 | 0.56 | 5.1 | 16 |
| 7 | 25 | — | 75 | 0.525 | 6.1 | 15 |
| 8 | — | 20 | 80 | 0.56 | 6.6 | 16 |

These examples showed the effect of BT and BST loading on the dielectric constant and breakdown strength. BT and BST are ferroelectric ceramics, having high dielectric constant and good insulating property. By adding the ferroelectric ceramics BT or BST into the silicone rubber, the dielectric constant (c) was significantly increased with the concentration of the ferroelectric ceramics. At the same time, unlike the circumstance of using traditional materials with high c, the breakdown strength is still maintained at 15 kV or higher, presenting a good insulating performance.

Example 9

A small amount of zinc oxide whiskers was used in this Example. The processing procedure is the same as in Example 1 except that components as shown in Table 3 were used. Test results of dielectric constant and breakdown strength are shown in Table 3.

TABLE 3

| Example No. | Silicone Rubber (Parts by Volume) | Barium Titanate (Parts by Volume) | Zinc Oxide Whisker (Parts by Volume) | Crosslinking Agent (Parts by Volume) | Dielectric Constant | Breakdown Strength (kV) |
|---|---|---|---|---|---|---|
| 9 | 80 | 18.5 | 1.5 | 0.56 | 6.4 | 15 |

ZnO whiskers have a cross-shaped prong morphology and are semi-conductive. The unique morphology connects the BT to form a network, which benefits to get higher dielectric constant while maintaining the breakdown strength above 15 kV. Compared with Example 1, the BT loading in Example 9 is lower, however, due to the presence of ZnO whisker, the dielectric constant is higher while the breakdown strength is maintained at 15 kV.

Examples 10-12

The procedure of Example 1 was repeated, except that components as shown in Table 4 were used, and specifically, the surface treated BT was milled with a small amount of conductive carbon black (CB) (<3 vol %) by using a mill machine (manufactured by Yashu Plastic Machinery, China) at a rotating speed of 1500 rpm for 10 minutes before mixing with other components. Test results of dielectric constant and breakdown strength are shown in Table 4.

TABLE 4

| Example No. | Silicone Rubber (Parts by Volume) | Barium Titanate (Parts by Volume) | Carbon Black (Parts by Volume) | Crosslinking Agent (Parts by Volume) | Dielectric Constant | Breakdown Strength (kV) |
|---|---|---|---|---|---|---|
| 10 | 80 | 17.8 | 2.2 | 0.56 | 6.3 | 19 |
| 11 | 80 | 18.9 | 1.1 | 0.56 | 6.2 | 19 |
| 12 | 88 | 11.5 | 0.5 | 0.616 | 4.7 | 18 |

It is clear that, at the same loading of fillers (see Examples 1, 10, and 11), the dielectric constant was further improved and good breakdown strength maintained by an addition of carbon black.

Example 13

The procedure as in Examples 10-12 was repeated except that the following formula was used:

| | |
|---|---|
| silicone rubber | 74.5 parts by volume, |
| BT | 20.92 parts by volume, |
| carbon black | 2.58 parts by volume, |
| ZnO whisker | 1.5 parts by volume, and |
| crosslinking agent (2,5-dimethyl-2,5-di(tert-butylperoxy)) | 0.5 part by volume. |

Property parameters as follows were obtained for the cured article:

| | |
|---|---|
| Shore A hardness: | 57 |
| elongation at break: | 530% |
| dielectric constant: | 8.1 |
| dielectric loss: | 0.03 |
| breakdown strength: | 15.4 kV/mm |
| volume resistivity: | $4.8 \times 10^{14}$ $\Omega \cdot cm$ |

It is clear that the formula of this example shows well balanced dielectric, insulation and mechanical properties. It can be seen that it has good dielectric strength, while achieves a high dielectric constant. Meanwhile, the dielectric loss of the sample is only 0.03, which is much lower than traditional materials with high dielectric constant (usually >0.1). Finally, the elongation at break of this composition is 530%, higher than the stretch ratio of 200% normally required after cold stretch. Therefore, this material is suitable for fabricating one-layer cold-shrink tube of MV cable termination.

Example 14

The same procedure as in Example 1 was repeated except that the following formula was used and KH450 in an amount of 0.5 wt % of BT replaced KH450 in an amount of 1 wt % of BT in the surface treatment of BT.

The formula used in Example 14:

| | |
|---|---|
| silicone rubber | 90 parts by volume, |
| BT | 17 parts by volume, |
| ZnO whisker | 3 parts by volume, and |
| crosslinking agent (2,5-dimethyl-2,5-di(tert-butylperoxy)) | 0.5 part by volume. |

Property parameters as follows were obtained for the cured article:

| | |
|---|---|
| elongation at break: | 590% |
| dielectric constant: | 7.8 |
| dielectric loss: | 0.06 |
| breakdown strength: | 15.0 kV/mm |
| volume resistivity: | $2.0 \times 10^{14} \, \Omega \cdot cm$ |

This Example shows a formula where the BT was treated with the silane coupling agent but was not milled with carbon black before mixing with other components. It is clear that, even without using carbon black, the composition still exhibits well balanced dielectric, insulation and mechanical properties. This material is also suitable for fabricating one-layer cold-shrink tube of MV cable termination.

Examples 15-19

10 kV MV cable termination tubes of one layer structure were prepared by using different compositions as in Examples 12-14, in different thickness for cables of various sizes as shown in Table 5. The termination tubes were prepared by injection molding. The uncured compositions of Example 12-14 were molded to tubes having sizes as described in Table 5 and cured at 185° C. for 15 min by using a silicone injection molding machine (YM-RH260-1500CC, manufactured by Wuxi Yangming Rubber Machinery Co., Ltd., China).

TABLE 5

| Example No. | Composition | Thickness of Termination Tube (mm) | Cable Cross-section Area (mm²) | AC 39 kV, 5 min | Initiative Partial Discharge (kV) | BIL* |
|---|---|---|---|---|---|---|
| 15 | Example 12 | 7.2 | 70 | Pass | 27.5 | Pass |
| 16 | Example 12 | 9.8 | 70 | Pass | 32 | Pass |
| 17 | Example 12 | 9.8 | 35 | Pass | 30 | Pass |
| 18 | Example 13 | 9.8 | 70 | Pass | 42 | Pass |
| 19 | Example 14 | 9.8 | 70 | Pass | 37 | Pass |

*95 kV, 10 times for each polarity.

An Initiative Partial Discharge ≥15 kV is considered to fulfill the requirement for cold shrink tubes of 10 kV MV cable terminations. It can be seen from Table 5 that, for a cable having a cross section area of 35-70 mm², a tube made from the composition of Examples 12-14 in a thickness of 7.2 mm or 9.8 mm can fulfill the requirement.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

We claim:

1. An insulating composition, comprising:
   about 70-100 parts by volume of a polymeric material;
   about 5-30 parts by volume of a ceramic filler which is surface-treated by a bifunctional coupling agent in an amount of about 0.1 wt % to about 4 wt % of the ceramic filler;
   about 0.1-5 parts by volume of a crosslinking agent;
   about 0-6 parts by volume of conductive carbon powder; and
   about 0.2-6 parts by volume of ZnO whisker, wherein the ZnO whisker has a cross-shaped prong morphology and is semi-conductive.

2. The composition of claim 1, wherein the ceramic filler is one or more selected from titanates, oxides, borides, carbides, silicates, hydroxides, nitrides, perovskites, phosphides, sulfides, silicides and combinations thereof.

3. The composition of claim 1, wherein the bifunctional coupling agent is at least one selected from silane coupling agents having two hydrolysable functional groups.

4. The composition of claim 1, wherein the ceramic filler is surface-treated by the bifunctional coupling agent in an amount of about 0.2 wt % to about 2 wt % of the ceramic filler.

5. The composition of claim 1, wherein the polymeric material is one or more selected from rubbers and elastomers.

6. The composition of claim 1, wherein the polymeric material is one or more selected from solid or liquid silicones, and hydrocarbon rubbers.

7. The composition of claim 1, wherein based on about 70-100 parts by volume of the polymeric material, the crosslinking agent is used in an amount of about 0.4-1.2 parts by volume.

8. The composition of claim 1, wherein the crosslinking agent is one or more selected from organic peroxide vulcanizing agents and metal-based crosslinking agents.

9. The composition of claim 1, wherein the conductive carbon powder is affixed on the surface of the ceramic filler which is surface-treated by a bifunctional coupling agent.

* * * * *

UNITED STATES PATENT AND TRADEMARK OFFICE
CERTIFICATE OF CORRECTION

PATENT NO. : 10,121,567 B2  
APPLICATION NO. : 14/763537  
DATED : November 6, 2018  
INVENTOR(S) : Ying Shi

Page 1 of 1

It is certified that error appears in the above-identified patent and that said Letters Patent is hereby corrected as shown below:

In the Specification

Column 11,
Line 24, delete "(c)" and insert in place thereof -- (ε) --.
Line 27, delete "c" and insert in place thereof -- ε --.

Signed and Sealed this
Eighteenth Day of June, 2019

Andrei Iancu
*Director of the United States Patent and Trademark Office*